Patented June 25, 1940

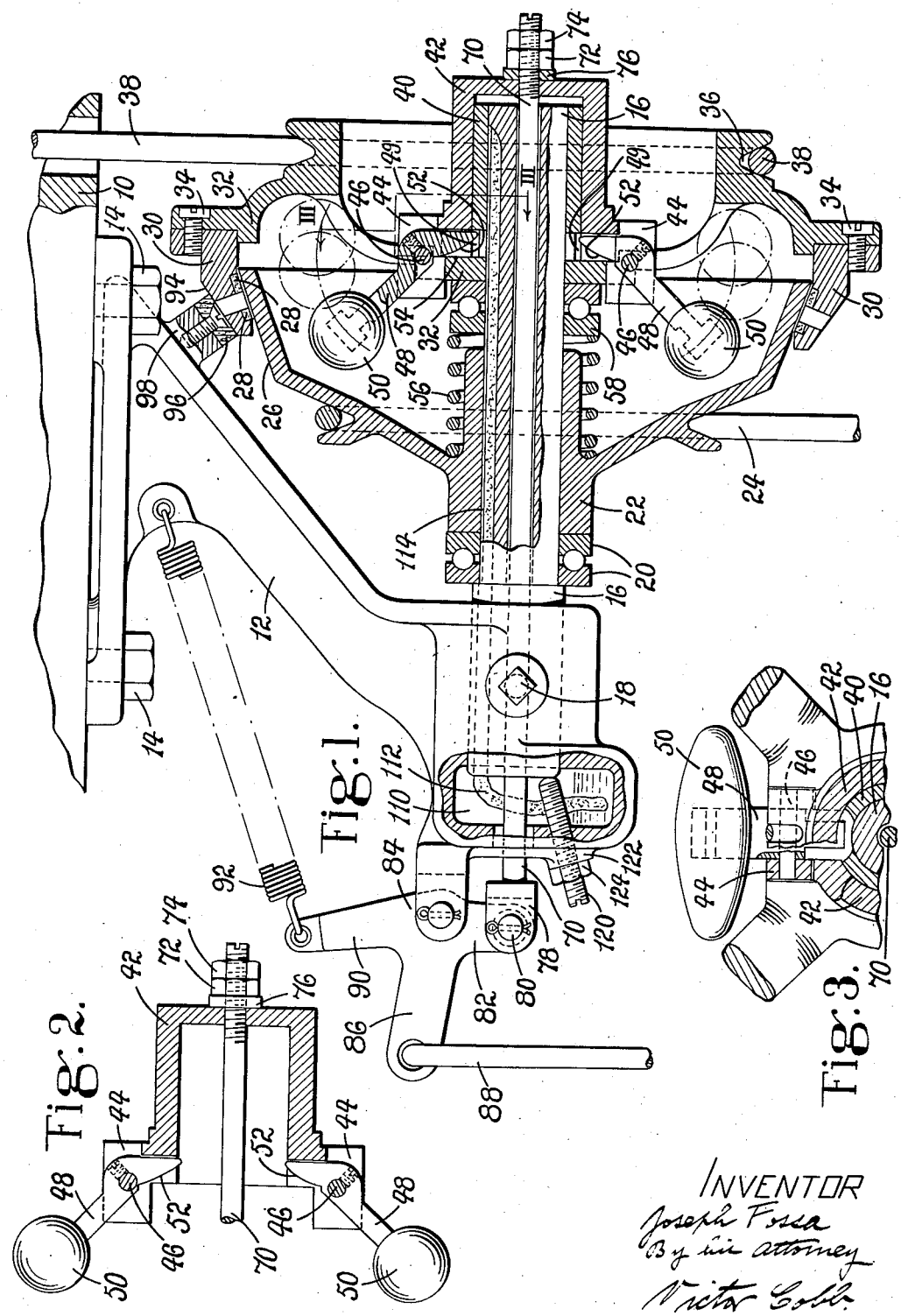

2,205,622

UNITED STATES PATENT OFFICE 2,205,622

SPEED CONTROLLING DEVICE

Joseph Fossa, Lynn, Mass., assignor to United Shoe Machinery Corporation, Borough of Flemington, N. J., a corporation of New Jersey Application October 5, 1938, Serial No. 233,407

9 Claims. (Cl. 192—18)

This invention relates to a mechanism for starting and stopping a machine and for changing, within suitable limits, the speed thereof. When a group of sewing or other light machines are arranged along a bench so that all may be driven from the same main shaft, each machine is controlled by its individual operator through a mechanism known as a "transmitter" and it is to such transmitters that the invention relates particularly.

It is an object of the invention to produce an improved, compact and simplified device of this type by which the driven machine may be started, then be driven at any speed within suitable limits at the will of the operator, the speed being automatically maintained constant until the operator desires to change to some other speed, and then finally to stop it.

To obtain the object of compactness and simplicity, the clutching surfaces used in the device are arranged to be engaged upon a bodily separating movement of the clutch members and, conversely, are arranged to be disengaged upon a bodily approaching movement of the members. When permitted, the bodily separating (or clutch engaging) movement is caused by spring pressure and, in the preferred construction, a compression spring is used coaxial with the driving and driven members and interposed between them. Furthermore, the clutching surfaces are preferably frusto-conical and are in overlapping relation, whether they are in contact or not.

A feature of the construction consists of a longitudinally movable sleeve which rotates with the driven member and on which is mounted a plurality of pivoted governor arms with weights at their outer ends, the mechanism being arranged so that the centrifugal force produced by rotation causes the weights to move outward radially while the inner ends of the arms move to cause a bodily approach of the driven member toward the driving member. This partially disengages the clutching surfaces until the remaining friction is just sufficient to drive the machine at a constant speed, which is determined by the position of the sleeve. The parts are then in balanced equilibrium, a tendency to increase the speed of the driven member producing reduced friction which tends to reduce its speed and vice versa. The speed of the driven member and the machine is thus kept constant until the position of the sleeve is changed.

Another feature of the construction consists of a stationary brake shoe which engages a frustoconical braking surface on the driven member and stops it when the sleeve is moved into an extreme position to disengage the clutch members.

Thus, the driven member is provided with two frusto-conical surfaces and the angle that the clutch engaging surface makes with the shaft is more acute than that of the brake engaging surface. With this construction, when the driven member is moved axially, the braking surfaces move toward and from each other at a faster rate than do the clutch engaging surfaces. This insures that the brake is completely disengaged before the clutch is engaged to start the rotation of the driven member, although only limited longitudinal motion of the driven member is available for this purpose.

A spring, and associated mechanism, is provided to position the sleeve in such extreme position. This spring is sufficiently strong to overcome the previously mentioned spring that causes engagement of the clutching surfaces. Manually operated means are provided, acting on this mechanism, to move the sleeve to engage the clutch, the speed, as before mentioned, being determined by the amount of movement of the sleeve away from stopped position.

Other objects and features of the invention will be best understood and appreciated from an inspection of the accompanying drawing when considered in connection with the following description.

In the drawing:

Fig. 1 shows the transmitter of the present invention mounted on the under side of a work bench, the principal parts of the mechanism being shown in longitudinal cross-section;

Fig. 2 is a separate view of the sleeve and the governor arms mounted thereon, taken from Fig. 1; and Fig. 3 is a detail view, partly in section, taken along the line III—III of Fig. 1.

10 represents a work bench, on the under side of which is mounted the transmitter arranged for driving a machine (not shown) mounted on the top of the bench. The transmitter is carried by a bracket 12 secured to the bench by means of screws 14. The large end of a shouldered shaft 16 is fixedly mounted in the bracket 12, being secured by a set screw 18. On the reduced portion of the shaft 16, and against the shoulder, is mounted a thrust ball bearing 20. Abutting the opposite side of the ball bearing, and loose on the shaft, is a driving clutch member 22 which is rotated at constant speed from the main shaft (not shown) by a belt 24. The driving clutch member 22 is cup-shaped and is provided with a frusto-conical clutching surface 26 having its larger diameter at the right in Fig. 1. Overlapping the surface 26 (but not touching it in disengaged position) is a frusto-conical ring 28 of friction material which is riveted to a metal ring 30. This ring 30 is mounted on a driven clutch member 32 and is held in position by a plurality of screws 34. The member 32 has a groove 36 which carries a belt 38 that passes through an opening in the bench 10 to drive the machine (not shown) to be controlled by the transmitter. The driven clutch member 32 is provided with a hub 40 which can turn freely on the reduced portion of the shaft 16. Arranged to slide on the outside of the hub 40, and to turn therewith, is a controlling sleeve 42 having radial lugs 44. Each of these lugs carries a pivot 46 on which is mounted a governor arm 48. A governor weight 50 is cast on the outer end of each arm 48. When the sleeve 42 is rotated, upon engagement of the clutch, the arms 48 tend to assume a radial position due to centrifugal force acting upon the governor weights 50. The inner portions of the arms 48 extend through slots 49 in the hub 40 of the driven member and each such portion is provided with a cam surface 52 which can make contact with a radial surface 54 on the driven member 32, this radial surface 54 forming one end of each of the slots 49. As the weights 50 swing outward radially, the driven member is forced to the left in Fig. 1 in a manner to be described.

A compression spring 56 and a ball bearing 58 are interposed between the driving member 22 and the driven member 32 and these, unless otherwise prevented, tend normally to engage the clutch by bodily separating the members 22 and 32 and engaging the clutching surfaces 26 and 28.

For the purpose of manually controlling the position of the sleeve 42 so as to control the starting and stopping of the machine to be driven and to control its speed, a rod 70 is slidably mounted in a longitudinal bore in the shaft 16. This rod passes through an opening in the end of the sleeve 42 and is provided with an adjusting nut 72 and a lock nut 74 whereby its effective length may be adjusted. Interposed between the outer end of the sleeve 42 and the adjusting nut 72 is an anti-friction washer 76. On the opposite end of the rod 70 is a connecting block 78 in which there is a loose pin 80 which connects the block to the lower depending arm 82 of a three-arm bell crank lever 84. The substantially horizontal arm 86 of this bell crank lever is connected to a treadle rod 88. The upright arm 90 of the bell crank lever is connected to a tension spring 92 which is fastened at its other end to the bracket 12. It will thus be seen that the pull of the spring 92 normally maintains the treadle rod 88 and its connected treadle (not shown) in their uppermost positions and at the same time pulls on the rod 70 to bring the washer 76 against the end of the sleeve 42 and press it as far to the left in Fig. 1 as other mechanism will permit. It should be noted also that the pull of the spring 92 is sufficient to overcome the action of the spring 56 and permit an outer frusto-conical surface 94 on the ring 30 on the driven member to engage a frusto-conical band 96 of friction material, mounted on an arc-shaped boss 98 on the bracket 12, to stop the driven member 32. The band 96 of friction material and its supporting boss 98 thus form a fixed braking member to cooperate with the driven member 32 to stop it.

In order better to understand the operation of the device, it should be noted that the driven clutch member 32 has extremely little longitudinal movement from the stopped position shown in Fig. 1 (with the brake engaged), to the position where the clutch is engaged by contact between the frusto-conical surface 26 and the cooperating friction surface 28.

The operation of the transmitter will now be described.

When the treadle rod 88 is depressed, the rod 70 is moved to the right in Fig. 1, permitting the sleeve 42 to follow it under the influence of the spring 56 as it expands against a ball bearing 58 and forces the driven member 32 to the right in the follow-up movement. This movement of the driven member 32 causes a bodily separating movement of the clutch members 22 and 32 and an engagement of the clutching surfaces 26 and 28. The driven member 32 of the clutch then starts the controlled machine through the belt 38.

Due to the fact that the inner ends of the governor arms 48 pass through slots in the hub 40, the sleeve rotates with the driven member and the governor weights 50 start to move outward radially, bringing the cam surface 52 into contact with the radial surface 54 on the driven member. As the member 32 can move only a slight amount longitudinally, the same is true of its surface 54, so that, with the inner ends of the governor arms 48 in a definite position, the pivots 46 move to the right in Fig. 1, thus moving the end of the sleeve 42, in lugs on which the pivots are mounted, into contact with the washer 76 which limits this movement of the sleeve. The amount of this movement is determined by the extent to which the treadle rod has been depressed. With the position of the sleeve 42 thus determined, further movement of the governor weights causes the cam surfaces 52, by their engagement with the surface 54 on the driven member 32, to move this member slightly to the left (Fig. 1), partially releasing the clutching friction between the surfaces 26 and 28 until such time as the parts are in balanced equilibrium. In this condition, if the clutch friction should be increased, the speed will be increased, but such increased speed would automatically reduce the friction and the speed, thus maintaining the balance. On the other hand, if the balance is disturbed by a decrease of friction between the surfaces 26 and 28, the parts will slow down and the weights 50 would move slightly inward toward the shaft, permitting the sleeve 42 and driven clutch member 32 to move to restore the balanced equilibrium. A similar action will occur and a new balanced equilibrium will be established when the treadle rod is moved to another position to obtain another automatically controlled speed.

When it is desired to stop the driven member 32 and the controlled machine, the treadle rod 88 is permitted to rise to its limit of motion under the influence of the spring 92. This spring, through the bell crank lever 84, pulls the rod 70 to the left in Fig. 1, moving the sleeve 42 in the same direction. The inner end of the sleeve abuts the driven member 32 forcing it also to the left, in a bodily approaching movement toward the driving clutch member 22, disengaging the clutching surfaces 26 and 28 and then applying the brake as heretofore explained, the spring 92 overcoming the effect of the spring 56.

For lubricating the parts, an oil chamber 110 is cast in the bracket 12 and a wick 112 draws oil from this chamber. The wick lies in a longitudinal groove in the upper side of the shaft 16 and supplies oil to the moving parts. To protect the wick from being caught by the rotating parts, it is covered by a loosely fitted leather strip 114.

For the purpose of alining the belts 24 and 38 with the pulleys on the main shaft and on the machine to be driven by the transmitter, an adjusting screw 120 passes through a boss 122 in the bracket 12 and contacts with the left-hand end of the shaft 16. By loosening the set screw 18 and adjusting the screw 120, the shaft 16 may be finely adjusted to bring the parts in alinement, after which the set screw 18 and a lock nut 124 are tightened.

It should be noted that the above device provides not only a convenient transmitter for starting and stopping a controlled machine, but also one in which the speed of the machine may be set or changed by manipulation of a treadle, the speed automatically remaining constant, even with a varying load.

Having described the invention, what is new and is desired to be secured by Letters Patent of the United States is:

1. A clutch mechanism having, in combination, a shaft, a driving clutch member, a driven clutch member, frusto-conical clutch engaging surfaces on each of said members arranged for engagement upon bodily axial separating movement of said members, a fixed brake member having a braking surface, a frusto-conical braking surface on the driven member arranged for engagement with the first-mentioned braking surface upon axial approaching movement of said members, the frusto-conical clutch engaging surfaces making a more acute angle with the shaft than the frusto-conical brake engaging surfaces, and means for effecting relative axial movement between said members.

2. A clutch mechanism having, in combination, a shaft, a driving clutch member, a driven clutch member, two frusto-conical surfaces on said driven member, one for engagement with a stationary cooperating braking surface and the other for engagement with a cooperating clutch engaging surface on the driving member, the first-mentioned surface making a less acute angle with the shaft than does the second, and means for effecting axial movement of the driven member to engage either one or the other of its frusto-conical surfaces with its cooperating surface.

3. A clutch mechanism having, in combination, a driving clutch member, a driven clutch member, overlapping frusto-conical clutch engaging surfaces on each of said members arranged for engagement upon bodily axial separating movement of said members, a fixed brake member having a frusto-conical braking surface, a frusto-conical braking surface on the driven member arranged for engagement with the first-mentioned braking surface upon axial approaching movement of said members, the angles of all of the frusto-conical surfaces being such that, upon relative axial movement of said members, the braking surfaces move toward and from each other at a faster rate than do the clutch engaging surface, and means for effecting relative axial movement between said members.

4. A speed controlling mechanism having, in combination, a constant speed driving clutch member, a driven clutch member, clutch engaging surfaces on each of said members arranged for engagement upon bodily axial separating movement of said members, a spring between the clutch members for producing a bodily axial separating movement of the members, centrifugal means for controlling said separating movement, and manually controlled means for starting the driven member and for acting on the centrifugal means to control the speed of and to stop said member.

5. A speed controlling mechanism having, in combination, a constant speed driving clutch member, a driven clutch member, overlapping frusto-conical clutch engaging surfaces on each of said members arranged for engagement upon bodily axial separating movement of said members, a fixed brake member having a braking surface, a braking surface on the driven member arranged for engagement with the first-mentioned braking surface upon axial approaching movement of said members, a spring between the clutch members for producing a bodily axial separating movement of the members, centrifugal means for controlling said separating movement, and manually controlled means for starting the driven member and for acting on the centrifugal means to control the speed of and to stop said member.

6. A speed controlling mechanism having, in combination, a constant speed driving clutch member, a driven clutch member, overlapping frusto-conical clutch engaging surfaces on each of said members arranged for engagement upon bodily axial separating movement of said members, a fixed brake member having a frusto-conical braking surface, a frusto-conical braking surface on the driven member arranged for engagement with the first-mentioned braking surface upon axial approaching movement of said members, a spring between the clutch members for producing a bodily axial separating movement of the members, centrifugal means for controlling said separating movement, and manually controlled means for starting the driven member and for acting on the centrifugal means to control the speed of and to stop said member.

7. A speed cotrolling mechanism having, in combination, a constant speed driving clutch member, a driven clutch member, clutch engaging surfaces on each of said members arranged for engagement upon bodily axial separating movement of said members, means for producing a clutching friction between the clutch members, a sleeve movable longitudinally relatively to the driving clutch member and rotatable with the driven clutch member, governor arms mounted on the sleeve and connected to control the clutching friction when the speed of the driven member is increased to a desired point, whereby a condition of balanced equilibrium is established where slippage between the clutch engaging members will maintain the speed of the driven member at said point, and manual means for positioning the sleeve for obtaining a speed desired by the operator.

8. A speed controlling mechanism having, in combination, a constant speed driving clutch member, a driven clutch member, clutch engaging surfaces on each of said members arranged for engagement upon bodily axial separating movement of said members, means for producing a clutching friction between the clutch members, a sleeve movable longitudinally relatively to the driving clutch member and rotatable with the driven clutch member, governor arms mounted on the sleeve and connected to effect relative axial movement between said members to establish a condition of balanced equilibrium so that slippage between the clutch engaging members will maintain a predetermined speed of the driven member, and manual means for positioning the sleeve to obtain a speed desired by the operator.

9. A speed controlling mechanism having, in combination, a constant speed driving clutch member, a driven clutch member, overlapping frusto-conical clutch engaging surfaces on each of said members arranged for engagement upon bodily axial separating movement of said members, a fixed brake member having a braking surface, a braking surface on the driven member arranged for engagement with the first-mentioned braking surface upon axial approaching movement of said members, a compression spring between the clutch members for producing a bodily axial separating movement of the members, a sleeve movable longitudinally relatively to the driving clutch member and rotatable with the driven clutch member, governor arms mounted on the sleeve and connected to move the driven clutch member and compress the spring as the speed of the driven member is increased, whereby slippage between the clutch engaging members occurs to maintain a predetermined speed of the driven member at a predetermined position of the sleeve, and manual means for positioning the sleeve at the will of the operator.

JOSEPH FOSSA.